Feb. 23, 1954

R. ERDMENGER 2,670,188

MIXING AND KNEADING MACHINE

Filed Sept. 20, 1950

INVENTOR.
RUDOLF ERDMENGER
BY Burgess + Dinklage
ATTORNEYS

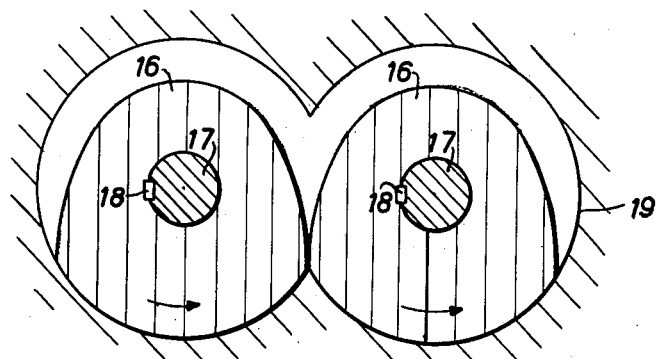
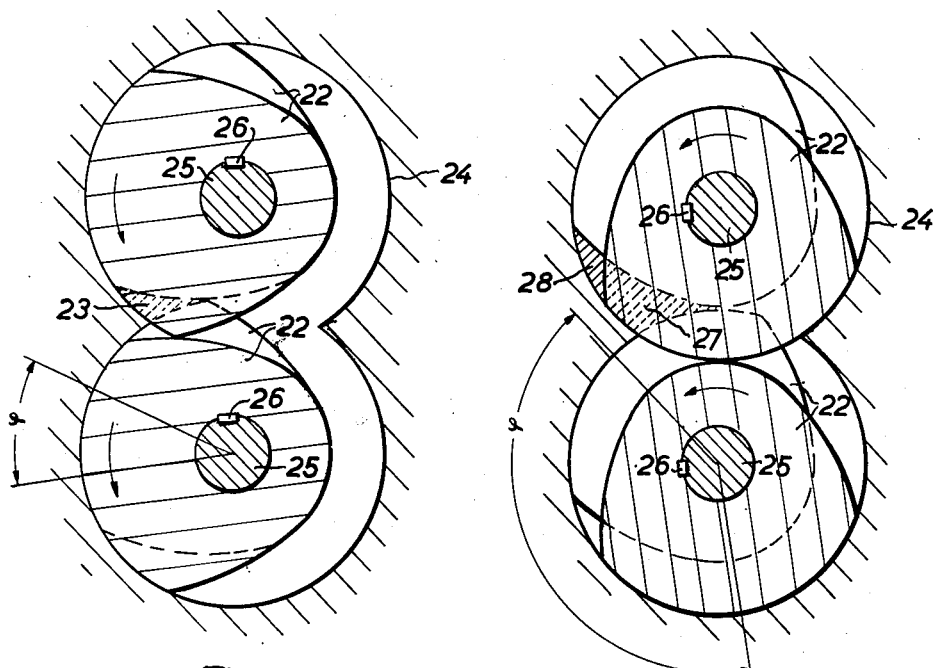

INVENTOR.
RUDOLF ERDMENGER

Patented Feb. 23, 1954

2,670,188

UNITED STATES PATENT OFFICE 2,670,188

MIXING AND KNEADING MACHINE

Rüdolf Erdmenger, Bergisch-Gladbach, Germany, assignor to Farbenfabriken Bayer Aktiengesellschaft, Leverkusen, Germany, a corporation of Germany Application September 20, 1950, Serial No. 185,881

Claims priority, application Switzerland September 23, 1949

5 Claims. (Cl. 259—104)

The present invention relates to an improved mixing and kneading machine.

It comprises at least two worm-shaped cam shafts gripping one into the other and rotating in the same or opposite direction in a casing.

The object of the present invention is a new machine for the improved mixing and kneading of liquid, viscous, plastic, pulverized, or granular material. The principal object of the present invention is a mixing and kneading machine comprising at least two mixing or kneading cam shafts. Each of the cam shafts is provided with cam-shaped protrusions. These cam-shaped protrusions lie spirally staggered along the shaft one beside the other, the angles between two adjacent protrusions being constant or different, so that the arrangement looks like winding stairs. The cam-shaped protrusions of two co-operating shafts grip one into the other. The shape of the cams and their position to the shaft is chosen so that corresponding cams of co-operating shafts come close together in any rotating position, so that they contact each other, but there may also be a small distance between them. The cam-shaped protrusions may consist of disks, vertically fixed on the shaft in staggered relation one behind the other. The axial conveying velocity of the material to be mixed or kneaded depends on the size of the angle between two adjacent disks. It can be decreased to nought, whereas the tangential velocity component remains unchanged, so that continuous as well as discontinuous mixing and kneading processes may be carried out.

Since the cam disks gripping into one another touch each other an automatic cleaning of the system occurs in that one disk scrapes off the other. As mentioned above the cam shafts may be obtained by fixing single disks one beside the other in staggered relation on the shaft, however, the cam shafts may also be made of one piece, for instance, they may be cast or turned on a lathe.

These cams produced by casting or turning on a lathe or the disks fixed on the shafts are advantageously of the same shape, size, and thickness, however, they may also be different, for instance it is possible to compose some disks of the same shape and then some disks of another shape, fixing them one beside the other on the shaft. It is also possible to arrange cams all of different shape one beside the other.

The angle $\varphi$ between the adjacent disks may be the same for all disks, it may, however, if so desired and required, be different for all or part of said adjacent disks.

Depending on the shape of the cams and their position to the rotating shaft various effects are obtained that may be of particular advantage.

With centrically fixed disks of lenticular shape the volume of the spaces between corresponding cams of the rotating shafts and the wall of the casing remains the same though the shape of those spaces changes continuously. The mixing effect in that case largely depends on a kind of shoveling action of the rotating cam shafts.

With eccentrically fixed disks of appropriate shape the volume of the spaces between corresponding cams of the rotating shafts and the wall of the casing changes periodically between almost nought and a maximum. In consequence of that a kneading and pressing off in a radial direction of the mass to be treated takes place. The pressure exerted by the cams depends on the breadth of the cams, the number of rotations of the shaft as well as on the shape of the walls of the casing, in which said cam shafts are rotatably fixed.

By appropriately choosing the angle between two adjacent eccentric cams or disks fixed in staggered relation on the shafts it is accomplished that the treated mass can either be pressed off in one axial direction or in both directions, whereby in the latter case a smaller portion of the material may be pressed back in opposite direction to the conveying direction. This process is repeated with each turn of each disk. Because of the pushing action of the winding stairs like arrangement of the cams the content of the machine also with this kind of kneading is conveyed with a certain velocity towards the discharge vent, that is to say, during the stay in the apparatus the material to be kneaded or mixed is subjected to many locally restricted and even repeated kneading processes.

This displacement of the mass to be kneaded between two opposite co-operating cams and the wall of the casing may, for instance, be almost completely effected when using circular eccentrically arranged disks as cams rotating in the same direction. This shape of the cams offers the further advantage that the material because of the two circular curves of the cam and the inner wall of the casing approaching each other during rotation of these shafts is compressed in a crescent-like space which decreases with the rotation of the shaft whereby the material is subjected to a shearing action.

The automatically occurring cleaning of the apparatus may completely be accomplished with circular eccentrically arranged cams since two co-operating disks contact each other in any position. The diameter of these disks is equal to that of the distance of the axis of the shafts.

In the accompanying drawing the invention is illustrated by way of example, showing the rotation of the shafts in the same direction.

The inventive idea is also applicable for shafts rotating in opposite direction, however, in that case the shape of the cams must be adapted to the rotation in opposite direction.

In the accompanying drawing Fig. 1 is a longitudinal section through a continuous mixing apparatus containing two cam shafts with cam disks, the circumference of which consists of circular curves of different radius.

Figs. 3, 4 and 5 are cross sections of a similar mixing machine as shown in Fig. 8, showing the cam disks of the two cam shafts in three different positions of rotation. The material to be mixed is marked black in Figs. 3 and 4.

Figs. 6 and 7 are cross sections of a similar mixing apparatus showing two cam shafts with two cam disks each lying one behind the other, the angle between two adjacent disks being designated φ, the disks lying behind the foremost disk being marked with dotted lines.

Figure 8:
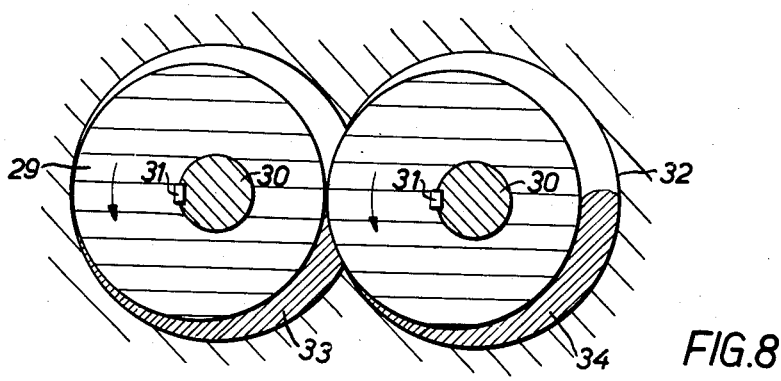
Figure 9:
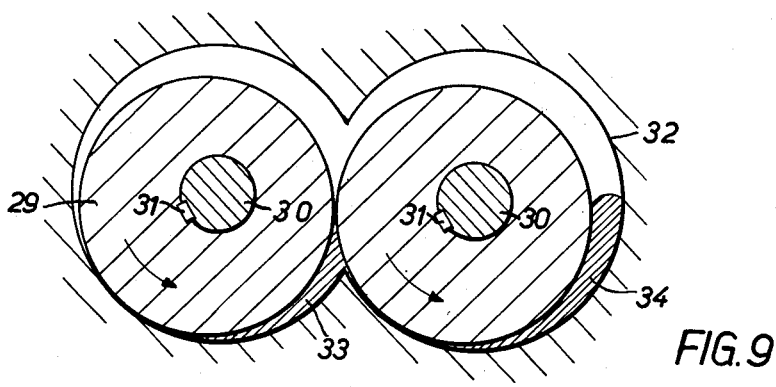
Figure 10:
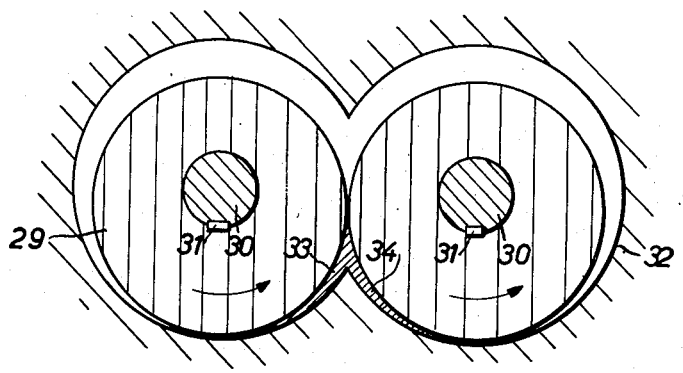

Figs. 8, 9, and 10 are cross sections of a mixing apparatus having cam shafts comprising annular eccenter disks. The annular eccenter disks are shown in three different positions of rotation. The material to be mixed is marked black.

Figure 1:
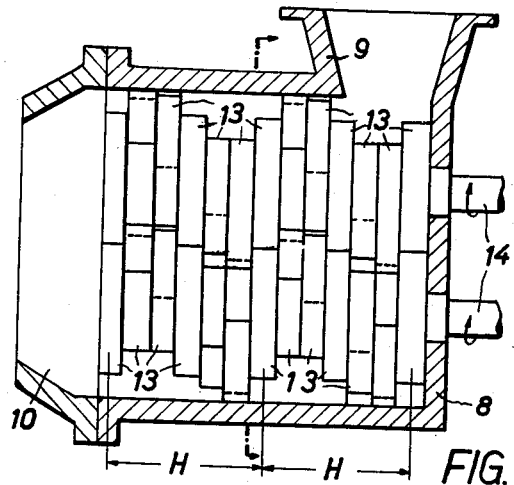
Figure 2:
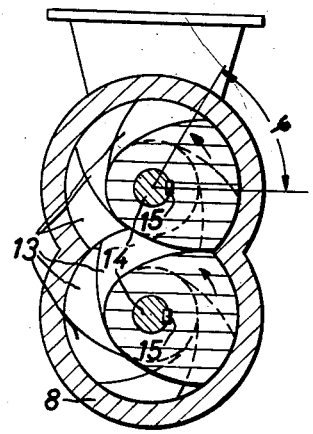
Fig. 2 is a cross section along the line e—f of the mixing apparatus as shown in Fig. 1, the edges of the disks lying behind the foremost disk are partially marked with dotted lines.

Figs. 1 and 2 show a mixing machine having two cam shafts. Each cam shaft comprises cam disks 13 being all of the same shape and size. The circumference of said cam disks is composed of arcs of different circles. The angle φ between two adjacent disks is 60°. The shaft is designated as 14, the pins as 15.

Figure 3:
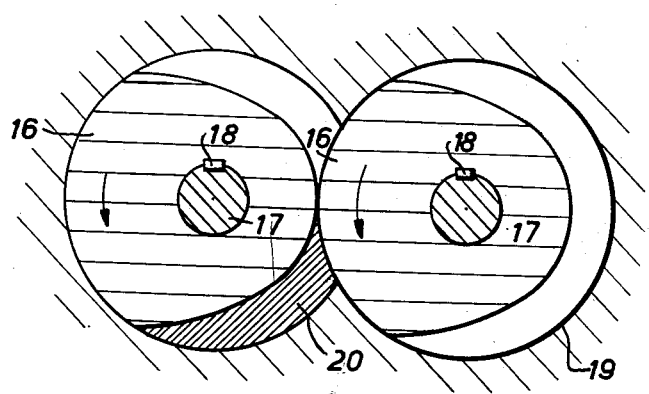
Figure 4:
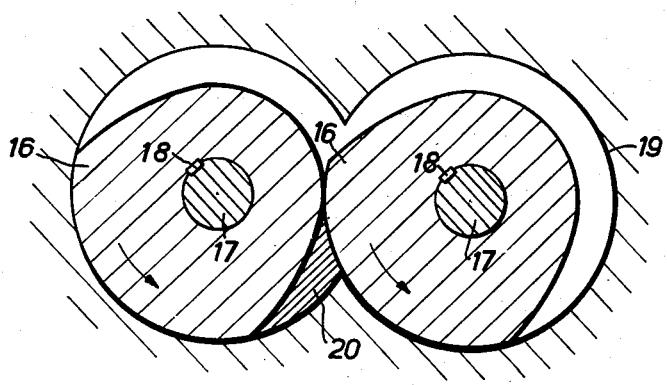

Figs. 3, 4 and 5 show a cross section of a mixing machine in different positions of rotation of the shafts. The cam disks are marked 16, the shafts 17, the pins by which the cam disks are fastened upon the shaft are marked 18, 19 is the casing. The space 20 and 21 between the disks 16 and the inner wall of the casing 19, marked black, containing the material to be mixed changes its shape during the rotation of the two disks and decreases its size to nought (see Fig. 5), so that the material is kneaded and axially discharged in opposite directions.

Fig. 6 shows two pairs of cam disks 22 schematically, the upper disks being lined for making it more easily understandable. The cam disks 22 are fastened on the shafts 25 by means of pins 26. The casing in which the cam shafts rotate in the direction of the arrows is designated 24. When the angle between two adjacent disks is small the material in the space 23 indicated in dots, between the lower disks 22 and the casing 24 is conveyed in only one axial direction, viz. in the transporting direction of the mixing devices since the space is covered on one side by the upper disk (lined).

When enlarging the angle φ between two adjacent cam disks 22, as shown in Fig. 7, the space between the lower disks 22 and the wall of the casing 24 is closed on one side only in part by the part designated as 27, viz. with the upper disk 22 (lined), whereas the part 28 (marked black) of that space is free on both sides, so that a portion of the material is axially pressed back opposite to the transporting direction. These portions mix with the material in that backward part of the apparatus where the same process of kneading and conveying in two directions is repeated. This process repeats itself with each pair of disks. The disks 22 are fastened on the shaft 25 by means of pins 26.

Figs. 8, 9 and 10 analogous to Figs. 3, 4 and 5 show how the material to be kneaded is pressed when using circular eccenter disks 29 having the same size. The disks 29 are eccentrically fixed on the shafts 30 by means of pins 31, the disks rotate in the casing 32. They are shown in three positions of rotation. It is to be seen that the material 33/34 (marked black) between the disks 29 and the wall of the casing 32 is almost completely removed during one fourth of a rotation of the disks. At the places marked black the material to be kneaded is crescent-like clamped and sheared between the wall of casing 32 and the circumference of the disks 29. Cleaning of the disks occurs automatically because opposite disks contact each other in any position of the shafts. The diameter of circular eccenter disks 29 is conforming to the axial distance of the shafts 30.

When the angle between adjacent circular eccenter disks is 180° no transport in axial direction occurs so that a discontinuous kneading process takes place. Pressing, cleaning, etc. take place in the same manner as described above.

I claim:

1. A mixing and kneading machine comprising a casing, at least two rotatable shafts positioned in said casing for rotation in the same direction, at least two cam disks eccentrically positioned, one on each said shaft for near circumferential contact with each other at any position of rotation of said shaft, said shafts and cam disks being dimensioned and positioned so that the circumferential portion of any cam disk farthest from the center of its shaft will upon rotation of said shafts pass in near surface contact with at least a portion of the immediate adjacent inner surface of said casing, and means for rotating said shafts in the same direction.

2. A mixing and kneading machine according to claim 1, in which said shafts are substantially parallel shafts and including a multiple number of vertical adjoining cam disks on each said shaft, each cam disk having the highest portion on its circumference angularly displaced from the highest portion of the circumference of the next adjacent cam disk.

3. A mixing and kneading machine according to claim 1, in which said cam disks are circular disks.

4. A mixing and kneading machine according to claim 1, in which said cam disks are pear-shaped disks, the profile thereof being defined by two opposite circular arcs, the radius of one said circular arc being equal to the distance between the center of rotation of said shaft and the nearest adjacent portion of the inner surface of said casing, the radius of said other arc being equal to the distance between the centers of said shafts minus the radius of said first arc, said arcs being connected to each other by two additional circular arcs having a radius corresponding to the axial distance between said shafts.

5. A mixing and kneading machine according to claim 1, in which said shafts are substantially parallel shafts and including a multiple number of vertical adjoining cam discs on each said shaft, each cam disc having the highest portion on its circumference angularly displaced at an angle of less than 180° from the highest portion of the circumference of the next adjacent cam disc.

RÜDOLF ERDMENGER.

References Cited in the file of this patent

UNITED STATES PATENTS

| Number | Name | Date |
|---|---|---|
| 68,101 | Mills | Aug. 27, 1867 |
| 149,197 | Chestnut et al. | Mar. 31, 1874 |
| 375,384 | Quack | Dec. 27, 1887 |
| 410,356 | Fakes | Sept. 3, 1889 |
| 1,771,863 | Schmidt | July 29, 1930 |
| 1,846,692 | Schmidt | Feb. 23, 1932 |
| 1,868,671 | Nelson | July 26, 1932 |
| 2,451,603 | Barker | Oct. 19, 1948 |

FOREIGN PATENTS

| Number | Country | Date |
|---|---|---|
| 173,457 | Great Britain | Jan. 5, 1922 |